Dec. 31, 1968    L. H. CAVENY ET AL    3,418,811
POSITIVE DISPLACEMENT CONTROL SYSTEM FOR CONTROLLING
THE FLOW OF GASES WITHIN A SOLID PROPELLANT
ROCKET MOTOR TO REGULATE THE BURNING
RATE OF THE SOLID PROPELLANT
Filed June 17, 1966
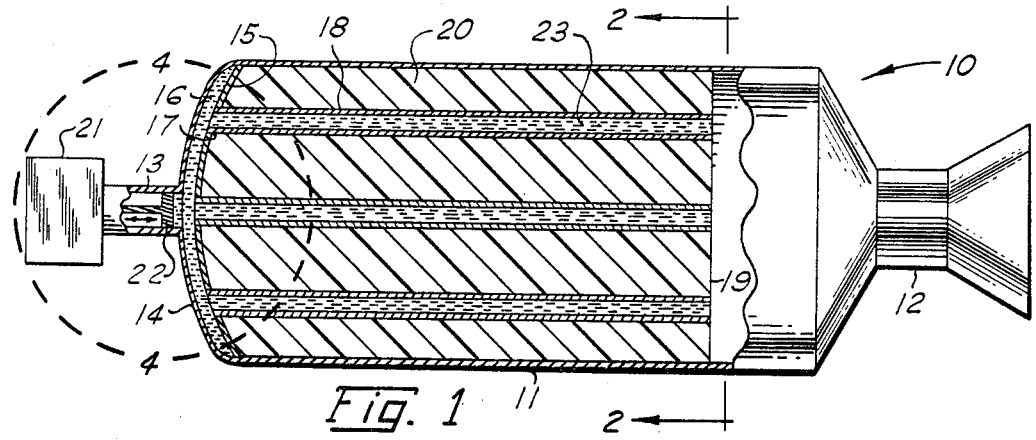
Fig. 1
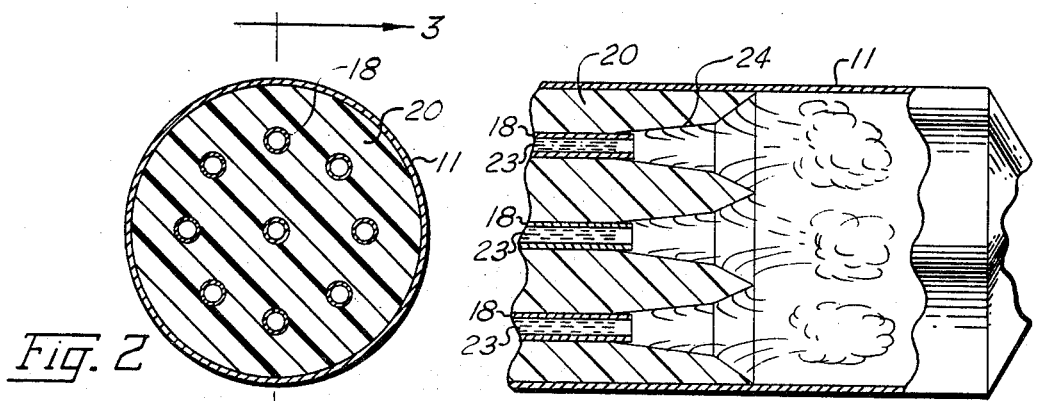
Fig. 2
Fig. 3
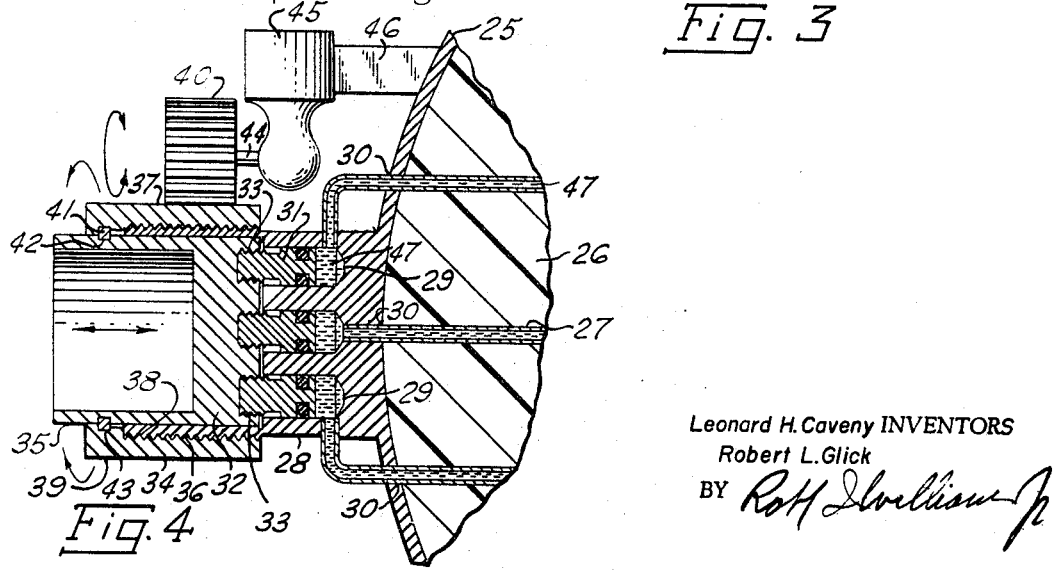
Fig. 4
Leonard H. Caveny INVENTORS
Robert L. Glick

United States Patent Office 3,418,811
Patented Dec. 31, 1968

3,418,811
POSITIVE DISPLACEMENT CONTROL SYSTEM
FOR CONTROLLING THE FLOW OF GASES
WITHIN A SOLID-PROPELLANT ROCKET MO-
TOR TO REGULATE THE BURNING RATE OF
THE SOLID PROPELLANT
Leonard H. Caveny and Robert L. Glick, Huntsville, Ala.,
assignors to Thiokol Chemical Corporation, Bristol,
Pa., a corporation of Delaware
Filed June 17, 1966, Ser. No. 558,340
2 Claims. (Cl. 60—254)

ABSTRACT OF THE DISCLOSURE

A positive displacement control system for solid propellant rocket motors having a solid propellant therein provided with a burning surface and having metallic tubes embedded therein and filled with an inhibiting fluid, a cylinder mounted on the motor case communicating with the tubes and having therein one or more pistons for retracting the fluid in the tubes to control the burning rate of the burning surface of the solid propellant.

This invention relates to improvements in the control of the flow of combustion gases in a solid propellant rocket motor and more particularly it relates to a positive displacement control system for the combustion gases created by the burning of the solid propellant, whereby positive control of the flow of the combustion gases within the rocket motor may be obtained to regulate the burning rate of the solid propellant within the rocket motor.

At the present time some attempts have been made, as exemplified by Patent 3,182,451, to control the rate of combustion of a solid propellant in a rocket motor. However, no attempt has been made to positively control the rate of flow of the combustion gases within the rocket motor, as exemplified by the instant invention. Since it is a known fact that the free volume in the tubes, as exemplified by the patent referred to, can result in uncontrolled gas flows within the tubes during ignition and periods of pressurization that are erratic or planned, are unpredictable, it has been found necessary to maintain positive control of such flow of the combustion gases, to be able to predict the operational flight of a solid propellant rocket motor using the flow of the combustion gases to regulate the burning rate of the solid propellant. The instant invention, therefore, that has ben static tested, is a solution to many problems that occur during the flight of the rocket motor, as illustrated in the former patent.

The rocket motor with which the present invention is adapted for use is clearly disclosed in copending application Ser. No. 403,554 and during the test firing of solid propellant rocket motors of this type, it was determined that if successful operational flights of this type of rocket motor were to be obtained, some means had to be developed to positively control the flow of the combustion gases within the rocket motor.

Positive control of the combustion gases within a rocket motor and the resultant regulation of the burning rate of the solid propellant within a rocket motor will provide a solid propellant rocket motor that can be as easily controlled as a liquid propellant rocket motor. Variations in thrust, as well as stop and start capabilities of the solid propellant rocket motor may be achieved by the use of the positive displacement control system embodying the instant invention.

The concept of merely venting combustion gases from the tubes to the atmosphere through a controlled vent, will not solve the problem of fully controlling the burning rate of the solid propellant in a rocket motor, because there is not a positive control of the flow of the combustion gases through the tubes which varies with the pressurization of the rocket motor and with the free volume in the tubes. The flow of the combustion gases will vary and unless it is possible to control the high and low rate of the flow of the combustion gases, a rocket motor that does not use positive controlled flow of the combustion gases, cannot be depended upon to perform the operational fight patterns which it is desired to achieve.

It is an object of this invention, therefore, to provide a positive displacement control system for a solid propellant rocket motor that will positively control the flow of the combustion gases within the rocket motor to regulate the burning rate of the solid propellant.

With the above and other objects and advantages in view, the invention consists of the novel details of construction, arrangement and combination of parts more fully hereinafter described, claimed and illustrated in the accompanying drawing in which:

FIGURE 1 is a longitudinal view, partly in section, partly in elevation and partly broken away, showing the installation of one form of the invention in a solid propellant rocket motor;

FIGURE 2 is a transverse sectional view of the rocket motor on the line 2—2 of FIGURE 1;

FIGURE 3 is a detailed fragmentary sectional view taken approximately on the line 2—2 of FIGURE 2 and showing the progressive burning of the solid propellant in the rocket motor under control of the form of the invention shown in FIGURE 1; and FIGURE 4 is an enlarged detailed fragmentary sectional view of another form of the invention that will be installed in relation to the rocket motor in that area encompassed by the dotted circle 4—4 in FIGURE 1.

Referring more in detail to the drawing, wherein like parts are designated by like reference numerals and more particularly to FIGURES 1 to 3 inclusive, wherein one form of the invention is illustrated, the reference numeral 10 is used to designate a rocket motor in which this form of the invention may be installed.

The rocket motor 10 comprises a motor case 11 having a nozzle 12 on the aft end thereof, and a cylindrical portion 13 integral with and extending outwardly of the medial portion of the head end 14 thereof.

To install this form of the invention in the motor case 11, a circular concavo-convex header plate 15 is positioned in the motor case 11 and rigidly secured at its peripheral circumferential edge to the interior surface of the wall of the motor case 11, adjacent the head end 14 thereof. The header plate 15 is evenly spaced from the head end 14 of the motor case 11 to provide a reservoir 16 for a purpose to be later described. The header plate 15 is provided with a plurality of relatively spaced openings 17 into each of which is rigidly secured one end of a tube 18. There is a tube 18 for each of the openings 17, thus there are a plurality of such tubes extending lonitgudinally of the motor case 11 and the size of these tubes may be varied as desired, also the free ends of the tubes 18 terminate at the burning surface 19 of the solid propellant 20 that is cast into the motor case 11 of the rocket motor 10.

Rigidly mounted on the outer end of the cylindrical portion 13 is a housing 21 of a size that will properly contain a conventional servo motor and gear reduction unit that will control the reciprocation of a piston 22 that is positioned within the cylindrical portion 13.

After the solid propellant 20 has been properly cured or just prior to the firing of the rocket motor 10, an inhibiting fluid 23 may be injected into the tubes 18 and the reservoir 16, as shown in FIGURE 1. The fluid 23 could be one of the viscous fluorocarbons, silicones or polymers, consumable caps or plugs can be positioned on or in the free ends of the tubes 18 to retain the fluid 23 therein.

The control system embodying this form of the invention, as illustrated in FIGURES 1 to 3 inclusive, is adapted by the use of a single piston 22 to provide an appropriately linear relationship between the chamber pressure of the rocket motor 10 and the rate of movement of the various components that are involved in controlling the flow of the combustion gases within the rocket motor 10. As has been previously stated, there must be a very precise positive control of the flow of the combustion gases from the aft end of the rocket motor 10 to the head end 14 thereof. To obtain complete linear relationship between chamber pressure and the control system of the instant invention, the tubes 18 are embedded in the solid propellant 20 as previously described, and the fluid 23 within the tubes 18 and reservoir 16 is so controlled that the burning surface of the tubes 18 conforms to the surface of the fluid 23 therein as it regresses within the tubes 18. The tubes 18 are relatively within and can be made of an easily combustible metal, such as aluminum, zirconium and titanium or any other similar metals or plastics that are familiar to those skilled in the art.

As the piston 22 is retracted by means of the motor and gear arrangement in the housing 21, as shown in FIGURE 1, the fluid 23 within the tubes 18 is retracted and the rate of retraction of the fluid 23 is linearly proportioned to the rate of retraction of the piston 22. Thus it is the rate of the retraction of the fluid 23 that controls the burning rate of the tubes 18. Conversely the flow of the fluid 23 can be reversed to retard the burning rate of the tubes 18, as well as the burning rate of the burning surface 19 of the solid propellant 20. It is also possible to replace the piston 22 with a cam or a hydraulic or pneumatic retraction member or system.

Regression of the burning surface 19 of the solid propellant 20 is related to the burning rate of the tubes 18, thus if the burning rate of the tubes 18 exceeds the burning rate of the burning surface 19 of the solid propellant, 20, the increase of the burning rate of the tubes 18 caused by the retraction of the fluid 23, will create conical formations 24, FIGURE 3, in the burning surface 19 of the solid propellant 20. Thus, as the rate of retraction of the fluid 23 within the tubes 18 is controlled, the steepness or the rate of increase of the inclination of the walls of the conical formations 24 is affected.

Since the tubes 18 are made from a combustible metal, all of the solid propellant 20 within the motor case 11 can be consumed, thus high mass fractions are obtainable and the system is adaptable to a wide range of rocket motor sizes.

Consequently, by controlling the retraction of the piston 22 which in turn controls the retraction of the fluid 23, the burning rate of the burning surface 19 of the solid propellant 20 may be increased, conversely reversing the travel of the piston 22 and thus reversing the flow of the fluid 23 results in decreasing the burning rate of the burning surface 19 of the solid propellant 20 or complete extinguishing of the burning surface 19 of the solid propellant 20 may be achieved if desired. Therefore, complete control of the operational flight of the rocket motor 10 may be obtained by the use of the instant embodiment of the invention.

In the form of the invention shown in FIGURE 4, a multipiston aspect of the instant invention is shown wherein a piston is provided for controlling the flow of the combustion gases into or within each of the tubes independently.

To illustrate this form of the invention, a fragment of a motor case 25, which corresponds to the motor case 11 of the rocket motor 10 of FIGURES 1 to 3 inclusive, is illustrated. A solid propellant 26 is cast into the motor case 25 and tubes 27, similar to tubes 18, are embedded in the solid propellant 26. In this form of the invention, a cylindrical header extension or block 28 is formed integrally with and extends outwardly of the medial portion of the head end of the motor case 25. The extension 28 is provided with a plurality of cylinders 29, one for each of the tubes 27, and the forward ends of the tubes 27 extend outwardly of the motor case 25 through openings 30 therein to be individually connected to the cylinders 29.

Each of the cylinders 29 has a piston 31 mounted for reciprocation therein and each of the pistons 31 are adjustably connected to a main piston retainer plate 32, as at 33.

The piston retainer plate 32 is mounted for reciprocation within an annular skirt portion 34 that is integral with and forms a continuation of the extension 28. The piston retainer plate 32 is also provided with an annular skirt portion 35 that extends outwardly and forwardly of the peripheral terminal edge of the skirt portion 34 on the extension 28.

The exterior surface of the skirt portion 34 of the extension 28 is provided with suitable threads 36 and mounted for reciprocation on the skirt portion 34 is a gear 37. Reciprocation of the gear 37 on the skirt portion 34 is accomplished through means of interior threads 38 on the gear 37 that mesh and cooperate with the threads 36 on the skirt portion 34 of the extension 28. The exterior surface of the gear 37 is provided with gear teeth 39 that mesh with a pinion gear 40 and a split ring 41 mounted in the annular groove 42 in the skirt portion 35 of the piston retaining plate 32 and the annular groove 43 in the interior surface of the gear 37 couples the skirt portion 35 of the piston retaining plate 32 to the gear 37. Thus as the gear 37 reciprocates on the skirt portion 34 of the extension 28 by reason of the coaction of the threads 36 on the skirt portion 34 of the extension 28 and the internal threads 38 of the gear 37, the gear 37 will cause simultaneous reciprocation of the piston retaining plate 32 and the pistons 31 in the cylinders 29 in the extension 28.

The pinion gear 40 is fixed to a drive shaft 44 of a conventional gear reduction unit that is operated by a conventional servomotor, both of which are mounted in a housing 45 that extends at right angles to the axis of the pinion gear 40 and gear 37 and is secured to the motor case 25 by means of a bracket 46.

In this form of the invention, as well as in the form of the invention previously described, an inhibiting fluid 47 may be injected into the tubes 27 and into the cylinders 29 and the fluid 47 could be one of the fluids previously referred to in the description of that form of the invention, shown in FIGURES 1 to 3 inclusive.

While the form of the invention illustrated in FIGURES 1 to 3 inclusive, utilizes only one piston to control the flow of the fluid 23, the form of the invention illustrated in FIGURE 4 utilizes a multi-piston arrangement, wherein a piston is used for each of the tubes 27 so that the flow of the fluid 47 within these tubes is individually and independently controlled. The operation of this form of the invention is as previously described and the rate of flow in each of the tubes 27 is directionally proportional linearly to the speed of rotation of the servo motor used for this purpose. The servo motor drives the gear reduction unit which in turn controls, through the pinion gear 40, the retraction of the piston retaining plate 32 to control the retraction of the fluid 47 within the tubes 27. For fluid retraction, the servo motor and its associated speed reduction unit do not have to be large, since it is only necessary to overcome the friction in the components that are necessary to provide this form of control system.

As previously stated, the relationship between the burning rate along the tubes and the speed of the servo motor in both forms of the invention, is linear and tube-to-tube variations in burning rate are minimized by this positive means of controlling the flow of the combustion gases into the tubes, either in unison or independently.

The control system may be used for motors that depend on the retraction of the fluid in the tubes in large or small quantities, depending on the burning rate of both the tubes and the solid propellant that are necessary to have the rocket motor perform its operational flight as required.

It is believed that from the foregoing description the invention will be clear to those skilled in the art and it is to be understood that variations therein may be adhered to providing such variations fall within the spirit of the invention and the scope of the appended claims.

Having thus described the invention what is claimed as new and desired to be secured by Letters Patent is:

1. A positive displacement control system for solid propellant rocket motors including a motor case having a nozzle secured to the aft end thereof and a solid propellant provided with a burning surface cast therein and having combustible metallic tubes embedded therein and extending longitudinally of the motor case in relatively spaced relation to each other, an inhibiting fluid in said tubes, means mounted on said motor case and communicating with said tubes to retract said fluid away from the burning surface of said solid propellant, said means comprising a cylindrical portion mounted on the head end of said motor case, a piston retaining plate mounted for reciprocation in said cylindrical portion, said cylindrical portion having a plurality of relatively spaced cylinders therein, said tubes being connected to said cylinders, said piston retaining plate having a plurality of pistons secured thereto and positioned in said cylinders, means mounted on said cylindrical portion for reciprocating said piston retaining plate and power means mounted on said motor case for operating said last said means for reciprocating said piston retaining plate, the retraction of said fluid being in direct relation with the burning rate of the burning surface of said solid propellant and said tubes.

2. A positive displacement control system for solid propellant rocket motors including a motor case having a nozzle secured to the aft end thereof and a solid propellant provided with a burning surface cast therein and having combustible metallic tubes embedded therein and extending longitudinally of the motor case in relatively spaced relation to each other, an inhibiting fluid in said tubes, means mounted on said motor case and communicating with said tubes to retract said fluid away from the burning surface of said solid propellant, said means comprising a cylindrical portion mounted on the head end of said motor case, a piston retaining plate mounted for reciprocation in said cylindrical portion, said cylindrical portion having a plurality of relatively spaced cylinders therein, said tubes being connected to said cylinders, said piston retaining plate having a plurality of pistons secured thereto and positioned in said cylinders, means mounted on said cylindrical portion for reciprocating said piston retaining plate and power means mounted on said motor case for operating said last said means for reciprocating said piston retaining plate, the exterior surface of said cylindrical portion having suitable threads thereon, a gear having interior threads to mesh with the threads on said cylindrical portion mounted thereon, said gear is connected to said piston retaining plate and is provided with exterior gear teeth which are engaged by a pinion gear connected to said power means, the retraction of said fluid being in direct relation with the burning rate of the burning surface of said solid propellant and said tubes.

References Cited

UNITED STATES PATENTS

| | | | |
|---|---|---|---|
| 3,097,481 | 7/1963 | Silver | 60—254 XR |
| 3,105,350 | 10/1963 | Eichenberger | 60—254 XR |
| 3,136,120 | 6/1964 | Grosh | 60—254 |
| 3,182,451 | 5/1965 | Messerly | 60—254 XR |
| 3,286,471 | 11/1966 | Kaplan | 60—254 |

CARLTON R. CROYLE, *Primary Examiner.*

U.S. Cl. X.R.

102—102